United States Patent
Koide et al.

(10) Patent No.: US 9,932,705 B2
(45) Date of Patent: Apr. 3, 2018

(54) SHEET-LIKE MATERIAL AND METHOD FOR PRODUCING SAME

(75) Inventors: Gen Koide, Gifu (JP); Katsufumi Yanai, Gifu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/634,672

(22) PCT Filed: Mar. 9, 2011

(86) PCT No.: PCT/JP2011/055455
§ 371 (c)(1),
(2), (4) Date: Sep. 13, 2012

(87) PCT Pub. No.: WO2011/114956
PCT Pub. Date: Sep. 22, 2011

(65) Prior Publication Data
US 2013/0005848 A1 Jan. 3, 2013

(30) Foreign Application Priority Data
Mar. 16, 2010 (JP) .................................. 2010-059437

(51) Int. Cl.
*D06N 3/00* (2006.01)
*D06N 3/14* (2006.01)
*C08J 9/00* (2006.01)
*C08J 9/06* (2006.01)

(52) U.S. Cl.
CPC .......... *D06N 3/0004* (2013.01); *C08J 9/0085* (2013.01); *C08J 9/06* (2013.01); *D06N 3/005* (2013.01); *D06N 3/14* (2013.01); *C08J 2375/04* (2013.01); *D06N 2205/023* (2013.01); *D06N 2205/04* (2013.01); *D06N 2205/243* (2013.01); *D06N 2211/10* (2013.01); *D06N 2211/14* (2013.01); *D06N 2211/261* (2013.01); *D06N 2211/28* (2013.01)

(58) Field of Classification Search
CPC ........ D06N 3/14; D06N 3/0004; D06N 3/005; D06N 2205/023; D06N 2205/04; D06N 2205/243; D06N 2211/10; D06N 2211/14; D06N 2211/261; D06N 2211/28; D06M 15/565; C08J 9/0085; C08J 9/06; C08J 2375/04
USPC .......................................................... 521/170
See application file for complete search history.

(56) References Cited

U.S. PATENT DOCUMENTS

| | | | | |
|---|---|---|---|---|
| 5,156,900 A | * | 10/1992 | Nishimura | ................... 428/151 |
| 6,479,153 B1 | | 11/2002 | Kato et al. | |
| 8,030,230 B2 | | 10/2011 | Yoshida et al. | |
| 2002/0098756 A1 | | 7/2002 | Sasaki et al. | |
| 2003/0134101 A1 | | 7/2003 | Kikuchi et al. | |

FOREIGN PATENT DOCUMENTS

| | | |
|---|---|---|
| CN | 1270251 A | 10/2000 |
| CN | 101250817 A | 8/2008 |
| CN | 101506432 A | 8/2009 |
| EP | 2058432 A1 | 5/2009 |
| JP | 05-078986 a * | 3/1993 |
| JP | H11335975 A | 12/1999 |
| JP | 2000-290879 A | 10/2000 |
| JP | 2000-297211 A | 10/2000 |
| JP | 3166054 B2 | 5/2001 |
| JP | 2002-069858 A | 3/2002 |
| JP | 2004092005 A | 3/2004 |
| JP | 2004-339614 A | 12/2004 |
| JP | 2008-081916 A | 4/2008 |
| KR | 20030020944 A | 3/2003 |

OTHER PUBLICATIONS

English-language abstract and machine translation of the Detailed Description of JP 05-078986 to Ikeda et al. obtained from the Japan Patent Office dated Jun. 9, 2014.*
International Search Report dated Jun. 14, 2011, application No. PCT/JP2011/055455.
Extended European Search Report for European Application No. 11756145.6, dated Jun. 21, 2017, 7 pages.
Chinese Office Action for Chinese Application No. 201510604925.1, dated Nov. 1, 2016, including English translation, 11 pages.
Korean Office Action for Korean Application No. 10-2012-7023900, dated Mar. 10, 2017 with translation, 8 pages.

* cited by examiner

*Primary Examiner* — Angela C Scott
(74) *Attorney, Agent, or Firm* — RatnerPrestia

(57) ABSTRACT

Disclosed is a sheet-like material which is produced by an environmentally friendly procedure and has an elegant appearance with piloerection, good wear resistance and good texture. Specifically disclosed is a sheet-like material containing a water-dispersed polyurethane within a fibrous base that contains extra-fine fibers having an average single fiber diameter of 0.3-7 um. The inside of the water-dispersed polyurethane is provided with pores each having a diameter of 10-200 um. Also specifically disclosed is a method for producing a sheet-like material by applying a polyurethane liquid to a fibrous base, wherein the polyurethane liquid is a water-dispersed polyurethane liquid that contains a foaming agent and a dry film of the polyurethane that constitutes the polyurethane liquid has a 100% modulus of 3-8 MPa.

2 Claims, No Drawings

SHEET-LIKE MATERIAL AND METHOD FOR PRODUCING SAME

CROSS REFERENCE TO RELATED APPLICATIONS

This application is the U.S. National Phase application of PCT International Application No. PCT/JP2011/055455, filed Mar. 9, 2011, and claims priority to Japanese Patent Application No. 2010-059437, filed Mar. 16, 2010, the disclosures of both applications are incorporated herein by reference in their entireties for all purposes.

FIELD OF THE INVENTION

The present invention relates to a sheet-like material, particularly to an environmentally friendly, leathery sheet-like material for which no organic solvent is used in production steps, and to a method for producing the same.

BACKGROUND OF THE INVENTION

A leathery sheet-like material formed primarily of a fibrous base and polyurethane has excellent features which natural leather lacks. Thus this material is widely used in various applications. Particularly, a leathery sheet-like material using a polyester-based fibrous base excels in lightfastness. Therefore, the range of use of this sheet-like material has been extended year after year to cover applications including clothing, chair upholstery, and automobile interior materials.

In producing such a leathery sheet-like material, the combination of the following steps is generally adopted: a step where a fibrous base is impregnated with an organic solvent solution of polyurethane; and a step where subsequently, the fibrous base thus obtained is immersed in water or an aqueous organic solvent solution that is a non-solvent for polyurethane to achieve wet coagulation of polyurethane. Examples of said organic solvent for polyurethane include water-miscible solvents such as N,N-dimethyl formaldehyde. However, organic solvents generally are highly harmful to humans. Therefore, there is a strong demand for a technique that does not use an organic solvent during production of a sheet-like material.

By way of a specific means for solving this problem, studies have been performed for development of a method use water-dispersed polyurethane, which is produced by dispersing polyurethane in water, in place of conventional organic solvent type polyurethane. However, a sheet-like material which is formed by impregnating or providing a fibrous base with water-dispersed polyurethane has a problem in that the texture tends to be hard. The following two points may be mentioned as main reasons for this: polyurethane is unevenly distributed in a fibrous base due to the occurrence of migration, and polyurethane strongly grasps entangled portions of fibers in the fibrous base. Studies are being made aiming to solve these problems.

As for the restriction of migration, i.e., the former problem, a technique is proposed whereby an inorganic salt is added to water-dispersed polyurethane as a thermosensitive coagulant so that the fluidity of the water-dispersed polyurethane is reduced by heating (see Patent Document 1). However, Patent Document 1 discloses no technique to solve the latter problem caused by polyurethane strongly grasping entangled portions of fibers in a fibrous base. Therefore, it follows that the texture of the sheet-like material is strongly affected by the flexibility of the polyurethane itself. It is conceivable that flexible polyurethane with low crystallinity is used for the purpose of developing a flexible texture in the sheet-like material. However, in this case, wear resistance will deteriorate, and sandpaper etc. used for grinding and napping will be easily clogged, thereby making it difficult to obtain satisfactory napping quality.

On the other hand, as for the restriction of the grasping of entangled points in fibers, i.e. the latter problem, an arrangement is proposed in which an association type thickener is added to water-dispersed polyurethane so that the polyurethane in a fibrous base forms a porous structure (see Patent Document 2). In this proposal, as polyurethane becomes porous, the bonding area between fibers and polyurethane decreases, resulting in a decrease in the grasping force at entangled points in fibers. However, if an association type thickener is added to water-dispersed polyurethane, stickiness is caused by the association type thickener in the sheet-like material which is impregnated with polyurethane. Therefore, a cleaning step for the association type thickener is required, resulting in low productivity. Furthermore, since the association type thickener is in the dissolved state in water-dispersed polyurethane, pores in the polyurethane structure are formed in portions where the association type thickener is present, and therefore, it is impossible to increase pore diameters, failing to obtain a significant texture-softening effect for the sheet-like material.

Furthermore, to provide a technique for obtaining a porous polyurethane structure, there is a proposal of a coated sheet produced by applying a coating material prepared by adding a foam stabilizer to polyurethane followed by mechanical foaming (see Patent Document 3). In the case of this proposal, a fibrous base surface is coated with mechanically foamed water-dispersed polyurethane to form a polyurethane film having a porous structure. However, if a fibrous base is impregnated with foamed water-dispersed polyurethane, then the foam may disappear during impregnation, making it impossible to form a porous polyurethane structure in the fibrous base.

Furthermore, apart from the above, there is another proposal of full-grain-like artificial leather produced by adding thermally expandable capsules to water-dispersed polyurethane using it to coat a fibrous base (Patent Document 4). In the case of this proposal, the thermally expandable capsules are expanded in the polyurethane to form a porous structure, and the impregnation of a fibrous base with polyurethane serves to form a porous polyurethane structure inside the fibrous base. However, this is accompanied by coloring due to thermal burns caused by the thermally expandable capsules added, and hardening of the texture of the sheet-like material as a result of the hardness of the thermally expandable capsules themselves.

Thus, for production of a sheet-like material, there have been no successful efforts in producing a flexible sheet-like material in a process that uses no organic solvents.

PATENT DOCUMENTS

[Patent Document 1] Japanese Patent No. 3166054
[Patent Document 2] Japanese Unexamined Patent Publication (Kokai) No. 2000-297211
[Patent Document 3] Japanese Unexamined Patent Publication (Kokai) No. 2002-69858
[Patent Document 4] Japanese Unexamined Patent Publication (Kokai) No. 2004-339614

SUMMARY OF THE INVENTION

Consequently, the present invention provides a sheet-like material that is formed by an environmentally friendly production process and has an elegant appearance with piloerection, high wear resistance, and good texture, and to provide a method for production thereof.

Thus, the present invention relates to a sheet-like material which is characterized by comprising water-dispersed polyurethane contained in a fibrous base formed of extra-fine fibers having an average single fiber diameter of 0.3-7 μm. The sheet-like material, according to exemplary embodiments, is also characterized in that the water-dispersed polyurethane contains pores having a diameter of 10-200 μm.

Furthermore, the present invention also relates to a method for producing a sheet-like material by adding a polyurethane liquid to a fibrous base, wherein the polyurethane liquid is a water-dispersed polyurethane liquid that contains a foaming agent, and also wherein a dry film formed from the polyurethane that constitutes the polyurethane liquid has a 100% modulus of 3-8 MPa.

According to the present invention, it is possible to produce, by means of an environmentally friendly production process, a sheet-like material which has not only an elegant appearance with piloerection, but also high wear resistance, which prevents the surface of the sheet-like material from suffering a weight loss caused by wearing by abrasion, as well as good texture with flexible touch.

DETAILED DESCRIPTION OF EMBODIMENTS OF THE INVENTION

A sheet-like material of embodiments of the present invention comprises water-dispersed polyurethane contained in a fibrous base.

Fibers formed of melt-spinnable thermoplastic resin including polyesters such as polyethylene terephthalate, polybutylene terephthalate, polytriethylene terephthalate, and polylactic acid; polyamides such as 6-nylon or 66-nylon; and thermoplastic celluloses such as acryl, polyethylene, and polypropylene, can be used as fibers constituting the fibrous base. Particularly, it is preferable to use polyester fibers from the viewpoint of strength, dimensional stability, and light resistance. The fibrous base may be a mixture of fibers of different materials.

As for the cross-sectional shape of fibers, a circular cross section is permissible. However, fibers having cross sections of different shapes such as an ellipse, a flat shape, a polygon like a triangle, a sector shape, or a cross may also be adopted.

The average single fiber diameter of fibers constituting a fibrous base is 0.3-7 μm. A sheet-like material having excellent flexibility and piloerection quality can be produced when the average single fiber diameter is 7 μm or less, more preferably 6 μm or less, and still more preferably 5 μm or less. On the other hand, setting the average single fiber diameter to 0.3 μm or more, more preferably 0.7 μm or more, and still more preferably 1 μm or more, makes it possible to produce a sheet that is good in chromogenic properties after dyeing, dispersibility of bundled fibers during piloerection treatment such as grinding with sandpaper or the like, and the ease of handling.

As for the configuration of a fibrous base formed of extra-fine fibers, it is possible to adopt a fibrous base in the form of a fabric, a knitted article, a nonwoven fabric, or the like. Particularly, a nonwoven fabric is preferable because the resulting sheet-like material will have good surface quality after surface napping treatment.

Examples of said nonwoven fabric include short fiber nonwoven cloth and long fiber nonwoven cloth. Short fiber nonwoven cloth is preferably used from the viewpoint of texture and quality.

Short fibers in said short fiber nonwoven cloth preferably has a length of 25-90 mm. Setting a fiber length to 25 mm or more allows a sheet-like material with high wear resistance to be produced owing to entanglement. Furthermore, by setting the fiber length to 90 mm or less, it is possible to obtain a sheet-like material with improved texture and quality.

If said nonwoven cloth comprises a fibrous base formed of extra-fine fibers, a preferred embodiment is a nonwoven cloth having a structure in which bundles of fibers (fiber bundles) are entangled together. The strength of a sheet-like structure increases as fibers in bundles are more entangled together. Nonwoven cloth according to the embodiment can be obtained by causing extra-fine fiber forming type fibers to be entangled in advance, followed by developing extra-fine fibers.

If extra-fine fibers or bundles thereof constitute said nonwoven cloth, woven or knitted fabrics may be added into the extra-fine fibers or bundles thereof with the aim of, for example, increasing the strength. Fibers constituting such woven or knitted fabrics preferably has an average single fiber diameter of 0.3-10 μm or so.

Polyurethane obtained by the reaction of a polymer diol, an organic diisocyanate, and a chain extending agent is preferable as polyurethane to be used for the present invention.

For example, a polycarbonate-based diol, a polyester-based diol, a polyether-based diol, a silicone-based diol, or a fluorine-based diol can be used as said polymer diol. A copolymer of a combination of these diols may also be used. Use of a polycarbonate-based diol or a polyether-based diol is preferable from the viewpoint of hydrolysis resistance. A polycarbonate-based diol or a polyester-based diol is also preferable from the viewpoint of light resistance and heat resistance. Use of a polycarbonate-based diol or a polyester-based diol is more preferable from the viewpoint of the balance among hydrolysis resistance, heat resistance, and light resistance. A polycarbonate-based diol is particularly preferable.

A polycarbonate-based diol can be produced, for example, through ester exchange reaction between alkylene glycol and ester carbonate or through reaction of phosgene or a chloroformate with alkylene glycol.

For example, useful alkylene glycols include linear alkylene glycols such as ethylene glycol, propylene glycol, 1,4-butane diol, 1,5-pentane diol, 1,6-hexane diol, 1,9-nonane diol, and 1,10-decane diol; branched alkylene glycols such as neopentyl glycol, 3-methyl-1,5-pentane diol, 2,4-diethyl-1,5-pentane diol, and 2-methyl-1,8-octane diol; alicyclic diols such as 1,4-cyclohexane diol; aromatic diols such as bisphenol A; and others such as glycerin, trimethylol propane, and pentaerythritol. Each of the diols may be either a polycarbonate-based diol which is produced from a single alkylene glycol or a copolymerized polycarbonate-based diol which is produced from two or more types of alkylene glycols.

Examples of said polyester-based diol include polyester diols produced by condensing one of various low molecular weight polyols and a polybasic acid.

For example, one or a plurality selected from the following can be used as said low molecular weight polyol: ethylene glycol, 1,2-propylene glycol, 1,3-propylene glycol, 1,3-butane diol, 1,4-butane diol, 2,2-dimethyl-1,3-propane diol, 1,6-hexane diol, 3-methyl-1,5-pentane diol, 1,8-octane diol, diethylene glycol, triethylene glycol, dipropylene glycol, tripropylene glycol, cyclohexane-1,4-diol, and cyclohexane-1,4-dimethanol. Furthermore, an adduct which is formed by adding one of various alkylene oxides to bisphenol A is also usable.

Furthermore, for example, one or a plurality selected from the following can be used as said polybasic acid: succinic acid, maleic acid, adipic acid, glutaric acid, pimelic acid, suberic acid, azelaic acid, sebacic acid, dodecane dicarboxylic acid, phthalic acid, isophthalic acid, terephthalic acid, and hexahydroisophthalic acid.

Examples of said polyether-based diol include polyethylene glycol, polypropylene glycol, polytetramethylene glycol, and copolymerized diols which are formed by combining these substances.

The number average molecular weight of said polymer diol is preferably 500-4,000. Using a polymer diol with a number average molecular weight of 500 or more, more preferably 1,500 or more makes it possible to prevent texture from becoming hard. Furthermore, when the number average molecular weight is 4,000 or less, more preferably to 3,000 or less, it is possible to maintain the inherent strength of polyurethane.

For example, usable organic diisocyanates include aliphatic diisocyanates such as hexamethylene diisocyanate, dicyclohexylmethane diisocyanate, isophorone diisocyanate, and xylylene diisocyanate; and aromatic diisocyanates such as diphenylmethane diisocyanate and tolylene diisocyanate, which may be used in combination. Particularly, aliphatic diisocyanates such as hexamethylene diisocyanate, dicyclohexylmethane diisocyanate, and isophorone diisocyanate are preferred from the viewpoint of light resistance.

Useful chain extending agents include amine-based chain extending agents such as ethylene diamine and ethylene bisaniline; and diol-based chain extending agents such as methylene bisaniline. Furthermore, a polyamine which is obtained by reacting polyisocyanate and water can also be used as chain extending agent.

A cross-linker may be used, in addition, with polyurethane for improving waterproofness, wear resistance, hydrolysis resistance, etc. Said cross-linker may be either an external cross-linker to be added to polyurethane as a third component or an internal cross-linker whereby reaction points constituting a cross-linking structure are introduced into the polyurethane molecular structure in advance. It is preferable to use an internal cross-linker because cross-linking points can be formed more uniformly in the polyurethane molecular structure, thereby mitigating the reduction in flexibility.

A compound containing an isocyanate group, an oxazoline group, a carbodiimide group, an epoxy group, a melamine resin, or a silanol group can be used as a cross-linker. However, if cross-linking progresses excessively, polyurethane tends to harden, resulting in the texture of the sheet-like material becoming hard. Therefore, a cross-linker containing a silanol group is preferably used from the viewpoint of striking a balance between reactivity and flexibility. If a silanol group is introduced into a polyurethane molecular structure as in internal cross-linker, polyurethane impregnated and coagulated in internal spaces of nonwoven cloth will form a cross-linking structure through siloxane bonding, with the result that the durability of polyurethane including hydrolysis resistance can be tremendously improved, with the texture of the sheet-like material maintained.

Furthermore, it is preferable that polyurethane used in the present invention contains a hydrophilic group. If a hydrophilic group is contained in the molecular structure, the resulting water-dispersed polyurethane will have improved dispersibility and stability.

Examples of said hydrophilic group include cationic ones such as quaternary amine salt; anionic ones such as sulfonate and carboxylate; nonionic ones such as polyethylene glycol; combinations of cationic and nonionic ones; and combinations of anionic and nonionic ones.

Above all, an nonionic hydrophilic group, which arouses no anxiety about harmful influences caused by yellowing due to light or by neutralizers, is particularly preferable.

That is, in the case of a hydrophilic group, a neutralizer is required. In this regard, if the neutralizer is a tertiary amine such as ammonia, triethyl amine, triethanol amine, triisopropanol amine, trimethyl amine, and diethanol amine, then amine is generated, volatilized, and discharged out of the system by the heat generated during film formation and drying. Consequently, for the purpose of restricting atmospheric discharge and degradation of work environment, it becomes indispensable to introduce a device for recovering volatilized amine. Furthermore, in a case where amine is not volatilized by heating but remains in the sheet-like material, which is a final product, it is conceivable that amine is discharged to the environment, for example, during incineration of products. In contrast to the above, in the case of a nonionic hydrophilic group, no neutralizer is used, and therefore, it is not necessary to introduce an amine recovery device, nor is there an anxiety about amine being left in the sheet-like material. Furthermore, in a case where a neutralizer is an alkaline metal such as sodium hydroxide, potassium hydroxide, or calcium hydroxide, or, for example, is a hydroxide of an alkali earth metal, then alkalinity is demonstrated if a polyurethane portion gets wet with water. However, in the case of a nonionic hydrophilic group, no neutralizer is used, and therefore, there is no need to worry about degradation due to hydrolysis of polyurethane.

Water-dispersed polyurethane may contain various additive agents including pigments such as carbon black; fire retardants such as phosphorous, halogenated, silicone-based, or inorganic fire retardants; ultraviolet absorbing agents such as benzotriazole-based, benzophenone-based, slicylate-based, cyanoacrylate-based, or oxalic-acid-based ultraviolet absorbing agents; light stabilizers such as hindered-amine-based or benzoate-based light stabilizers; hydrolysis resistant stabilizers such as polycarbodiimide; plasticizers; antistatic agents; surface-activating agents; softening agents; water repellents; coagulation conditioning agents; dyes; antiseptic agents; antibacterial agents; deodorants; fillers such as cellulose particles; and inorganic particles such as silica and titanium oxide.

It is preferable that the content of polyurethane in the sheet-like material of the present invention is 10-80% by mass. By setting the polyurethane content to 10% or more by-mass, more preferably to 15% or more by-mass, not only is the sheet strength obtained, but also fibers can be prevented from falling off. Furthermore, by setting the polyurethane content to 80% or less by-mass, more preferably to 70% or less by-mass, the texture can be prevented from becoming hard, resulting in satisfactory piloerection quality being obtained.

For the sheet-like material of the present invention, it is beneficial that pores with diameters of 10-200 μm be included in the inside of water-dispersed polyurethane. By providing polyurethane with a porous structure, it is possible to make polyurethane flexible, not based on molecular structure, but as a structural body. Accordingly, the texture of the sheet-like material becomes flexible. Furthermore, in the inside of the sheet-like material, the force by which polyurethane grasps fibers is weaker in a porous structure than in a nonporous structure. Therefore, it shows high grindability when napped with sandpaper or the like. Thus an elegant appearance provided with piloerection can be obtained. If the pore diameter is too small, the texture of the sheet-like material cannot be softened. If the pore diameter is too large, the wear resistance of the sheet-like material is deteriorated. Therefore, the pore diameter is preferably 20-180 µm, more preferably 30-160 µm. Furthermore, as for the porous structure, either communicating pores or independent bubbles are permissible.

It is preferable that the density of the sheet-like material of the present invention is 0.2-0.7 g/cm$^3$. By setting the density to 0.2 g/cm$^3$ or more, more preferably to 0.3 g/cm$^3$ or more, the surface appearance becomes finer, resulting in high-grade quality being able to be developed. On the other hand, by setting the density to 0.7 g/cm$^3$ or less, more preferably to 0.6 g/cm$^3$ or less, the texture of the sheet-like material can be prevented from becoming hard.

In the next place, the method for producing the sheet-like material of the present invention will be described. In the method for producing the sheet-like material of the present invention, a specific polyurethane liquid is applied to a fibrous base.

As regards a means for forming extra-fine fibers for the fibrous base, it is preferable that extra-fine fiber development type fibers are used. By using extra-fine fiber development type fibers, a configuration where fiber bundles are entangled together can be obtained in a stable manner.

As for extra-fine fiber development fibers, it is possible to adopt, for example, sea-island type fibers and exfoliation type composite fibers, said sea-island type fibers being such that one of two thermoplastic resin components having different solvent solubilities is defined as a sea component, with the other thermoplastic resin component defined as an island component, and that the sea component is dissolved and removed by means of a solvent or the like, resulting in the island component being formed into extra-fine fibers, said exfoliation type composite fibers being such that two thermoplastic resin components are alternately disposed on fiber cross-sectional surfaces radially or multilayer-wise, and that both components are exfoliated and divided, resulting in fibers being divided into extra-fine fibers. Particularly, as for sea-island type fibers, by removing the sea component, it is possible to provide appropriate gaps among island fibers, that is, among extra-fine fibers. Therefore, sea-island type fibers are favorable from the viewpoint of flexibility and texture.

There are different sea-island type fibers including sea-island composite fibers and mixed yarn fibers, said sea-island composite fibers being such that a spinneret for sea-island composites is used to spin a yarn composed of mutually disposed two components, that is, the sea component and the island component, and said mixed yarn fibers being such that spinning is performed by mixing the two components of the sea component and the island component. Sea-island composite fibers are favorable in that uniform extra-fine fibers are obtained, and that extra-fine fibers of sufficient lengths are obtained, thereby making contributions to the strength of the sheet-like material.

Usable materials for the sea component of sea-island type fibers include, for example, polyethylene, polypropylene, polystyrene, polylactic acid, or copolymerized polyester produced from sodium sulfoisophthalic acid, polyethylene glycol, etc. Particularly preferable are polylactic acid or copolymerized polyester produced from, for example, sodium sulfoisophthalic acid and polyethylene glycol, both of which are alkali resolvable and capable of being decomposed without using an organic solvent.

Sea removing treatment for a case where sea-island type fibers are used may be performed either prior to the application of polyurethane to the fibrous base or subsequent to said application. If sea removing treatment is performed prior to the application of polyurethane, a structure is formed in which polyurethane is in direct and close contact with extra-fine fibers, resulting in extra-fine fibers being able to be firmly grasped, with the consequence that the wear resistance of the sheet-like material turns out to be satisfactory. On the other hand, if sea removing treatment is performed subsequent to the application of polyurethane, gaps caused by the removed sea component are generated between polyurethane and extra-fine fibers, with the result that a structure is formed in which urethane does not directly grasp extra-fine fibers. Therefore, the texture of the sheet-like material turns out to be soft.

Sea removing treatment can be performed by immersing sea-island type fibers in a solvent and squeezing out the liquid. Solvents usable for dissolving the sea component include organic solvent such as toluene and trichloroethylene for a sea component of polyethylene, polypropylene, or polystyrene, and aqueous alkaline solution such as sodium hydroxide for a sea component of copolymerized polyester or polylactic acid.

As a method of entangling fibers or fiber bundles in non-woven fabric, it is possible to adopt needle punching or water jet punching.

As for polyurethane which constitutes polyurethane liquid to be applied to a fibrous base in the method for producing the sheet-like material of the present invention, polyurethane to be adopted should preferably be able to form a dry film with a 100% modulus in the range of 3 MPa to 8 MPa. The 100% modulus is an index which shows the hardness of polyurethane. In the present invention, polyurethane having a 100% modulus in this range is preferably used so that the constraint force of fibers in the sheet-like material provided with polyurethane is strong, allowing satisfactory wear resistance to be developed. Furthermore, if such polyurethane is used to form a polyurethane-containing sheet-like material having a porous polyurethane structure, the resulting material will show satisfactory grindability when napped with sandpaper or the like, leading to an elegant appearance with piloerection. The 100% modulus of polyurethane dry film is preferably in the range of 3 MPa to 6 MPa. The polyurethane-containing sheet-like material meeting this requirement will have a better texture and wear resistance. Furthermore, the 100% modulus can be adjusted by controlling the proportion of a hard segment structure attributable to isocyanate and chain extending agents contained in the polyurethane molecular structure and selecting an type of polyol, isocyanate, and the like.

The polyurethane liquid to be used in the present invention is preferably a water-dispersed liquid in which polyurethane is dispersed and stabilized in water. Water-dispersed polyurethane liquids are classified into forced emulsification type polyurethane which is forcibly dispersed and stabilized using a surface-activating agent, and self-emulsification type polyurethane which has a hydrophilic structure in the polyurethane molecular structure and can be dispersed and stabilized in water even if no surface-activating agent is present. For the present invention, either type may be used, but self-emulsification type polyurethane is preferred in that no surface activating agent is contained. If forced emulsification type polyurethane containing a surface activating agent is used, the surface activating agent can cause the occurrence, for example, of stickiness of the surface of the sheet-like material, making a cleaning step necessary and resulting in an increased number of processing steps and increased cost. Furthermore, since the existence of a surface activating agent causes a decrease in the waterproofness of polyurethane, which is in the form of a film, and accordingly, polyurethane tends to fall off into the dyeing solution during the dyeing of the polyurethane-containing sheet-like material.

The concentration of water-dispersed type polyurethane (content of polyurethane in water-dispersed polyurethane liquid) is preferably in the range of 10% by mass to 50% by mass from the viewpoint of the storage stability of the water-dispersed polyurethane liquid.

Furthermore, for the purpose of improving storage stability and film producing properties, said polyurethane liquid may contain a water soluble organic solvent at a content of 40% by mass in the polyurethane liquid. However, from the viewpoint of film production environment etc., it is preferable that the content of organic solvent is 1% or less by mass.

Furthermore, it is preferable that the water-dispersed urethane liquid to be used for the present invention has thermosensitive coagulability. By using a water-dispersed polyurethane liquid having thermosensitive coagulability, it is possible to uniformly apply polyurethane in the thickness direction of the fibrous base. Thermosensitive coagulability of a polyurethane liquid refers to its property of decreasing in fluidity and coagulating when the polyurethane liquid is heated to reach a certain temperature (thermosensitive coagulation temperature). To produce a polyurethane-containing sheet-like material, polyurethane liquid is applied to a fibrous base, and then the fibrous base is coagulated by dry-heat coagulation, wet-heat coagulation, wet coagulation, or a combination of these techniques, followed by drying to produce a fibrous base provided with polyurethane. As for the method for coagulating water-dispersed polyurethane liquid, dry coagulation is practicable. In this case, there occurs a migration phenomenon in which polyurethane is concentrated on the surface layer. As a result, the texture of the sheet-like material provided with polyurethane tends to become harder.

The thermosensitive coagulation temperature of a water-dispersed polyurethane liquid is preferably in the range of 40° C. to 90° C. By setting the thermosensitive coagulation temperature to 40° C. or more, the polyurethane liquid will have a high stability during storage, making it possible, for example, to restrict the sticking of polyurethane to the pertinent machine during operation. Furthermore, setting the thermosensitive coagulation temperature to 90° C. or less makes it possible to effectively curb a migration phenomenon involving polyurethane in the fibrous base.

A thermosensitive coagulant may be added, as appropriate, to bring the thermosensitive coagulation temperature into said range. Examples of said thermosensitive coagulant include inorganic salts such as sodium sulfate, magnesium sulfate, and calcium sulfate; and radical reaction initiators such as sodium persulfate, potassium persulfate, ammonium persulfate, azobisisobutyronitrile, and benzoyl peroxide.

It is preferable that the water-dispersed polyurethane liquid to be used for the present invention contains a foaming agent. A foaming agent refers to an additive which, when heated, decomposes and generates gas such as nitrogen gas and carbon dioxide. If a polyurethane liquid containing a foaming agent is used, polyurethane is foamed when heated after addition of a polyurethane liquid to a fibrous base, resulting in the formation of a porous structure. As stated above, the polyurethane used in the present invention is preferably a hard polyurethane which, when dried into a film, has a 100% modulus in the range of 3 MPa to 8 MPa. However, by processing the polyurethane into a porous structure, the resulting polyurethane-containing sheet-like material will have a flexible texture. This is because the bonding area between polyurethane and fibers in the sheet-like material provided with polyurethane is reduced, resulting in a decrease in the fiber-constraining force.

Furthermore, by processing hard polyurethane into a porous structure inside the sheet-like material provided with polyurethane, it is possible to obtain, in a napping step, an elegant appearance provided with piloerection. As for the formation of elegant piloerection, it is advantageous if in the napping step, polyurethane can be selectively ground to a larger extent than fibers. Here, the harder the polyurethane is, the more easily it can be ground. However, if hard polyurethane is used, the texture of a sheet-like material provided with polyurethane becomes too hard to be acceptable for practical use. Consequently, when using hard polyurethane and processing it into a porous structure, the resulting sheet-like material provided with polyurethane will have a flexible texture while the grindability of polyurethane is kept satisfactorily high.

Furthermore, after foaming, the foaming agent itself remains merely as residue of a low molecular weight compound. Thus in contrast to a case where a thermal expansion capsule is used, there occurs neither coloring due to thermal burns nor hardening of the texture of the sheet-like material.

For example, one of the following substances can be used as a foaming agent to be added to a polyurethane liquid: an organic foaming agent such as dinitrosopentamethylene tetramine (Celmike A manufactured by Sankyo Kasei Co., Ltd., for example), azodicarbonamide (Celmike CAP manufactured by Sankyo Kasei Co., Ltd., for example), p,p'-oxybisbenzene sulfonyl hidrazide (Celmike S manufactured by Sankyo Kasei Co., Ltd., for example), or N,N-dinitrosopentamethylene tetramine ("Cellular GX" manufactured by Eiwa Chemical Ind. Co., Ltd., for example); or an inorganic foaming agent such as sodium hydrogen carbonate (Celmike 266 manufactured by Sankyo Kasei Co., Ltd., for example).

As for the amount of the foaming agent to be added to a polyurethane liquid, a content of 0.5-20% by mass in the solid content of polyurethane is preferable. By setting the content to 0.5% or more by mass, more preferably to 1% or more by mass, it is possible to effectively developing the effect of softening of the sheet-like material texture achieved by foaming. On the other hand, by setting the content to 20% or less by mass, more preferably to 15% or less by mass, it is possible to prevent the sheet-like material from suffering from a decrease in the wear resistance due to excessive foaming.

In the case of an embodiment of the polyurethane liquid having thermosensitive coagulability as mentioned above, it is preferable that the foaming temperature at which the foaming agent pyrolyzes and generates gas is higher than the thermosensitive coagulation temperature of polyurethane. Accordingly, gas generated from foaming does not escape from polyurethane, resulting in a porous structure being able to be formed in a stable manner.

It is preferable that the foaming temperature of a foaming agent is in the range of 100° C. to 200° C. By setting said temperature to 100° C. or more, more preferably to 120° C. or more, it is possible to effectively form a porous structure because it is easy to adjust the timing of foaming by, for example, starting foaming after initiation of coagulation of polyurethane. On the other hand, by setting said temperature to 200° C. or less, more preferably to 180° C. or less, it is possible to prevent the polyurethane from being pyrolyzed by the heating performed for foaming.

It is preferable that the viscosity of water-dispersed polyurethane to be used in the present invention is 1-900 mPa·s under a measurement condition of 25° C. By setting said viscosity to 900 mPa· or less, more preferably to 500 mPa·s or less, it is possible to allow the polyurethane liquid to infiltrate into the fibrous base. On the other hand, by setting said viscosity to 1 mPa·s or more, it is possible to efficiently coagulate polyurethane.

It is preferable that a polyurethane liquid which contains a foaming agent and is to be used in the present invention is such that its dry film density is in the range of 0.2 g/cm$^3$ to 0.6 g/cm$^3$. By setting said density to 0.6 g/cm$^3$ or less, more preferably to 0.5 g/cm$^3$ or less, it is possible to effectively obtain a satisfactory texture. On the other hand, by setting said density to 0.2 g/cm$^3$ or more, more preferably to 0.3 g/cm$^3$ or more, it is possible to maintain wear resistance.

It is possible to coagulate polyurethane by subjecting a polyurethane liquid, which is impregnated or applied to a fibrous base, to dry-heat coagulation, wet-heat coagulation, wet coagulation, or a combination of thereof.

The wet-heat coagulation temperature is to be set to a level not lower than the thermosensitive coagulation temperature of polyurethane, and 40-200° C. is preferable. By setting the wet-heat coagulation temperature to 40° C. or more, more preferably 80° C. or more, it is possible to shorten the time required to start the coagulation of polyurethane so that the migration phenomenon can be curbed to a further extent. On the other hand, by setting the wet-heat coagulation temperature to 200° C. or less, more preferably 160° C. or less, it is possible to prevent thermal degradation of polyurethane.

The wet coagulation temperature is to be set to a level not lower than the thermosensitive coagulation temperature of polyurethane, and 40-100° C. is preferable. By setting the wet coagulation temperature in hot water to 40° C. or more, more preferably 80° C. or more, it is possible to shorten the time required to start the coagulation of polyurethane so that the migration phenomenon can be curbed to a further extent.

It is preferable that the dry coagulation temperature and the drying temperature are 80-180° C. By setting the dry coagulation temperature and the drying temperature to 80° C. or more, more preferably 90° C. or more, a high productivity can be is achieved. On the other hand, by setting the dry coagulation temperature and the drying temperature to 180° C. or less, more preferably 160° C. or less, it is possible to prevent thermal degradation of polyurethane.

Foaming treatment with a foaming agent may be performed either in a polyurethane coagulation step or in a drying step. A step of performing heat treatment at a still higher temperature may be further provided after drying.

If, subsequent to adding polyurethane, the sheet-like material provided with polyurethane is cut in the sheet thickness direction into halves or into several pieces, this is preferable because a high production efficiency will be achieved.

Prior to the napping treatment to be described later, a lubricant such as a silicone emulsion may be applied to the sheet-like material provided with polyurethane. Furthermore, an act of applying an antistatic agent prior to napping treatment is preferable in that grinding chips generated from the sheet-like material due to grinding are prevented from tending to be piled up on sandpaper.

Napping treatment may be performed for piloerection. Napping treatment can be carried out by, for example, by using sandpaper, a roll sander, or the like to perform grinding The sheet-like material may be dyed. As for the dyeing method, it is preferable to use a jet dyeing machine because at the same time as the sheet-like material is dyed, a crumpling effect is provided, thereby softening the sheet-like material.

The dyeing temperature depends on the fiber type, but a range of 80-150° C. is preferable. By setting said temperature to 80° C. or more, more preferably to 110° C. or more, it is possible to dye fibers efficiently. On the other hand, by setting said temperature to 150° C. or less, more preferably 130° C. or less, it is possible to prevent degradation of polyurethane.

As for the dye to be used, it may be selected simply according to the type of fibers constituting the fibrous base. For example, a dispersible die is used for polyester-based fibers while an acid dye or an alloy dye is used for polyamide-based fibers. They may be used in combination. If dyeing is performed with a dispersive dye, reduction cleaning may be performed subsequent to dyeing.

Moreover, it is also preferable to use a dyeing aid during dyeing. By using a dyeing aid, it is possible to improve the uniformity and the reproducibility of dying. Furthermore, in the same bath as for dyeing, or subsequent to dyeing, it is possible to apply finishing agent treatment using a softening agent, such as silicone, an antistatic agent, a water repellent, a flame retardant, a light resistance agent, or an antibacterial agent.

Sheet-like materials which can be obtained according to the present invention can be used suitably as interior materials having very elegant appearances and serving as surface materials for items such as furniture, chairs, and wall materials, as well as seats, ceilings, interior furnishings, etc. in vehicular interiors of automobiles, electric trains, aircraft, etc.; clothing materials used for shirts, jackets, uppers and trims for casual shoes, sports shoes, men's shoes, and women's shoes, as well as bags, belts, wallets, etc., and portions thereof; and industrial materials such as wiping cloth, abrasive cloth, and CD curtains.

EXAMPLES

Hereinafter, on the basis of Examples, more detailed explanations will be made on embodiments of the sheet-like materials of the present invention and the method for production thereof. However, the present invention is not limited only to these Examples.

[Evaluation Method]
(1) Average Single Fiber Diameter

The average single fiber diameter was calculated as follows: Scanning electron microscope (SEM) photographs of the surface of a fibrous base or of a sheet-like material were taken at 100 magnifications; 100 fibers were selected at random; the single fiber diameters were measured; and the average was calculated.

In this regard, if extra-fine fibers constituting the fibrous base or the sheet-like material have a non-circular cross section, calculation is made by regarding the diameter of the circumcircle of the non-circular cross section as the single fiber diameter. Furthermore, in cases, for example, where circular cross sections and non-circular cross sections coexist, or where cross sections having greatly different single fiber diameters coexist, calculation is made for a total 100 samplings taken so that they vary according to their cross-sectional shape or size. However, in a case where reinforcement fabrics or knitted articles are inserted in addition to non-woven fabric consisting of extra-small fibers or fiber bundles thereof, fibers of said reinforcement fabrics or knitted articles are excluded in taking samplings for the measurement of the average single fiber diameter of extra-fine fibers.

(2) Diameters of Pores in Polyurethane

Cross sections at 10 places inside a sheet-like material were selected at random, and were observed at 300 magnifications using a scanning electron microscope (SEM). Then said cross sections were subjected to image processing using Winroof image processing software. An image was processed to two-valued data so that the pores in polyurethane would be black. Their diameters were calculated assuming that the area of each pore represented the area of a true circle. Subsequently, the average value of said diameters was calculated. In this regard, in the case of interconnected pores, diameter calculations were made assuming that the areas of the interconnection portions represented the areas of true circles. Subsequently, the average value of said diameters was calculated.

(3) 100% Modulus of Polyurethane Dry Film

A water-dispersed liquid with 20%-by-mass polyurethane containing no foaming agent was placed in a 5 cm×10 cm×1 cm polyethylene tray, and was air-dried at room temperature for eight hours, followed by heat treatment for two hours in a hot-air drying machine set at 120° C. to prepare a 1 mm thick dry polyurethane film. For this polyurethane dry film, the tensile strength at 100% elongation was measured as its 100% modulus in accordance with Method A (Strip Method) described in "Tensile Test Machine" JIS-L1096-8.12.1 (1999).

(4) Film Density of Dry Film Made from Polyurethane Liquid

A water-dispersed liquid with 20%-by-mass polyurethane containing a foaming agent was placed in a 5 cm×10 cm×1 cm polyethylene tray, and was air-dried at room temperature for eight hours, followed by heat treatment for two hours in a hot-air drying machine set at a temperature 10° C. higher than the foaming temperature of the foaming agent to prepare a 1 mm thick dry polyurethane film. The film density of the dry polyurethane film was calculated by dividing the measured mass of the dry polyurethane film by its length, width, and thickness. The average value for five film samples is defined as the film density.

(5) Thermosensitive Coagulation Temperature of Polyurethane Liquid

A polyurethane liquid weighing 20 g was put in a test tube with a diameter of 12 mm. Then a thermometer was inserted, with its tip located below the liquid level. Subsequently, the test tube was sealed and immersed in a hot water bath with a temperature of 95° C. so that the polyurethane liquid level was below the hot bath water level. The rise in temperature in the test tube was observed on the thermometer, and the test tube was pulled up at appropriate timings, and shook to the extent that it was possible to confirm the presence or absence of fluidity of the polyurethane liquid surface, the duration of the above operation being limited to within five seconds each time. The temperature at which the polyurethane liquid surface lost fluidity was defined as its thermosensitive coagulation temperature. This measurement was performed three times for each polyurethane liquid sample, and the average value was calculated.

(6) Viscosity of Polyurethane Liquid

A polyurethane liquid was used, and measurements were made at a liquid temperature of 25° C. in accordance with JIS K7117-1 (1999).

(7) Texture

In accordance with Method A (45° Cantilever Method) described in JIS L1096-8.19.1 (1999), five 2×15 cm test specimens were prepared for each of the longitudinal direction and the lateral direction, and were placed on a horizontal table having an inclined surface with a temperature of 45° C. Each test specimen was slid, and the scale reading was taken at the time when the central point of one end of the test specimen came into contact with the inclined surface. The average value for the five test specimens was obtained. In this connection, as for texture, values of 50 mm or less were regarded as satisfactory.

(8) Evaluation of Wear Resistance

Nylon fibers formed of nylon 6 and having a diameter of 0.4 mm were cut perpendicularly to the fiber longitudinal direction, to a length of 11 mm. Such nylon fibers were put together into bundles each consisting of 100 thereof. A circular brush (composed of 9,700 nylon threads) was formed in such a way that a total of 97 bundles were disposed along six concentric circles contained in a 110 mm diameter circle as follows: one bundle at the center, six bundles along a 17 mm diameter circle, 13 bundles along a 37 mm diameter circle, 19 bundles along a 55 mm diameter circle, 26 bundles along a 74 mm diameter circle, and 32 bundles along a 90 mm diameter circle). This circular brush was subjected to wear test in which the surface of a circular sample (45 mm in diameter) of a sheet-like material was abraded under the conditions of a load of 8 lbs. (about 3,629 g) and a rotation speed of 65 rpm. The change in weight of the specimen caused by the test was measured. The average value for five samples was calculated to represent the weight loss due to wear. Here, as for wear resistance, values of 40 mg or less were regarded as satisfactory.

(9) Appearance Quality

For the appearance quality of a sheet-like material, a total of 20 people, consisting of 10 adult males and 10 adult females, all of whom were in satisfactorily healthy conditions, were assigned as evaluators, and five-grade evaluation was performed on the basis of visual evaluation and sensory evaluation as described below. The evaluation grade which was mentioned by the largest number of evaluators was taken to represent the grade of appearance quality. Here, as for appearance quality, the third to fifth grades were regarded as satisfactory.

Fifth grade: Uniform piloerection exists. The dispersion state of fibers is satisfactory. The appearance is satisfactory.

Fourth grade: This is an evaluation grade between the fifth grade and the fourth grade.

Third grade: There are portions where the dispersion state is slightly unsatisfactory. However, piloerection exists. The appearance is passably satisfactory, Second grade: This is an evaluation grade between the third grade and the first grade.

First grade: On the whole, the disperse state of fibers is very unsatisfactory. The appearance is defective.

Example 1

(Non-Woven Fabric for Fibrous Base)

Polyethylene terephthalate copolymerized with 8-mol % 5-sulfoisophthalate sodium was used as sea component while polyethylene terephthalate was used as island component. As a result, sea-island composite fibers with 36 islands per filament and with an average single fiber diameter of 17 μm, were obtained. The composite was composed of a 45%-by-mass sea component and a 55%-by-mass island component. The sea-island composite fibers obtained were cut to a length of 51 mm to prepare staples. They were processed by a card and cloth wrapper to form fiber webs, which were then processed by needle punching to produce non-woven fabric. This non-woven fabric was shrunk by immersing it in hot water with a temperature of 98° C. for two minutes. Then the non-woven fabric was dried for five minutes at a temperature of 100° C. to provide non-woven fabric for fibrous base production.

(Polyurethane Liquid)

Two parts by mass of ammonium persulfate (APS) and five parts by mass of sodium hydrogen carbonate (Celmike 266 manufactured by Sankyo Kasei Co., Ltd., foaming temperature 140° C.) were added as thermosensitive coagulation agent and foaming agent, respectively, to a liquid containing, as solid content, 100 parts by mass of polycarbonate-based self-emulsification type polyurethane liquid containing polyoxyethylene chain (Polyurethane 1), which had been prepared by using polyhexamethylene carbonate as polyol component and using dicyclohexylmethane isocyanate as isocyanate component. Then water was added so that the overall liquid would have a solid content of 10%-by-mass to provide a water-dispersed polyurethane liquid.

(Addition of Polyurethane)

Said non-woven fabric for fibrous base was impregnated with said polyurethane liquid, and treated for five minutes in a wet-hot atmosphere at a temperature of 100° C., followed by air-drying for five minutes at a drying temperature of 120° C. and dry-hot treatment for two minutes at a temperature of 150° C. to provide a polyurethane-containing sheet with a polyurethane content by mass of 30% relative to the mass of the island component in the non-woven fabric.

(Sea Removal, Napping, Dyeing, and Reduction Cleaning)

Said polyurethane-containing sheet was immersed in aqueous sodium hydroxide solution with a concentration of 10 g/L heated at 95° C. for 30 minutes to provide a sea-deprived sheet having a structure of a sea-island fiber composite deprived of the sea component. The average single fiber diameter on the surface of the sea-deprived sheet was 2 μm. Then napping treatment was applied to the surface of the sea-deprived sheet by grinding with 240-mesh endless sandpaper. Subsequently, a circular dyeing machine was used to dye the sheet with a dispersible dye, and reduction cleaning was then carried out to provide a sheet-like material.

The resulting sheet-like material had good appearance quality, texture, and wear resistance.

Example 2

(Non-Woven Fabric for Fibrous Base)

Non-woven fabric for fibrous base similar to that used in Example 1 was used.

(Polyurethane Liquid)

The same operations as in Example 1 were carried out, except that the amount of a foaming agent was three parts by mass, and as a result, a water-dispersed polyurethane liquid was obtained.

(Addition of Polyurethane)

Said non-woven fabric for fibrous base was impregnated with said polyurethane liquid, and treated similarly to Example 1 to produce a polyurethane-containing sheet.

(Sea Removal, Napping, Dyeing, and Reduction Cleaning)

For said polyurethane-containing sheet, sea removal, napping, dyeing, and reduction cleaning were performed similarly to Example 1 to provide a sheet-like material.

The resulting sheet-like material had good appearance quality, texture, and wear resistance.

Example 3

(Non-Woven Fabric for Fibrous Base)

Non-woven fabric for fibrous base similar to that used in Example 1 was used.

(Polyurethane Liquid)

Two parts by mass of ammonium persulfate (APS) and three parts by mass of sodium hydrogen carbonate (Celmike 266 manufactured by Sankyo Kasei Co., Ltd., foaming temperature 140° C.) were added as thermosensitive coagulation agent and foaming agent, respectively, to a liquid containing, as solid content, 100 parts by mass of polycarbonate-based self-emulsification type polyurethane liquid containing polyoxyethylene chain (Polyurethane 2), which had been prepared by using polyhexamethylene carbonate as polyol component and using dicyclohexylmethane isocyanate as isocyanate component and which had a less hard segment content than Polyurethane 1 used in Example 1. Then water was added so that the overall liquid would have a solid content of 10% by mass to provide a water-dispersed polyurethane liquid.

(Addition of Polyurethane)

Said non-woven fabric for fibrous base was impregnated with said polyurethane liquid, and treated similarly to Example 1 to produce a polyurethane-containing sheet.

(Sea Removal, Napping, Dyeing, and Reduction Cleaning)

For said polyurethane-containing sheet, sea removal, napping, dyeing, and reduction cleaning were performed similarly to Example 1 to provide a sheet-like material.

The resulting sheet-like material had good appearance quality, texture, and wear resistance.

Example 4

(Non-Woven fabric for Fibrous Base)

Non-woven fabric for fibrous base similar to that used in Example 1 was used.

(Polyurethane Liquid)

Eighteen parts by mass of sodium sulfate and 18 parts by mass of p,p'-oxybis benzene sulfonyl hydrazide (OBSH) (Celmike S manufactured by Sankyo Kasei Co., Ltd., foaming temperature 160° C.) were added as thermosensitive coagulation agent and foaming agent, respectively, to a liquid containing, as solid content, 100 parts by mass of polycarbonate-based forced-emulsification type polyurethane containing triethylamine carboxylate (Polyurethane 3), which had been prepared by using polyhexamethylene carbonate as polyol component and using dicyclohexylmethane isocyanate as isocyanate component and which had a larger hard segment content than Polyurethane 1 used in Example 1. Then water was added so that the overall liquid would have a solid content of 10% by mass to provide a water-dispersed polyurethane liquid.

(Addition of Polyurethane)

Said non-woven fabric for fibrous base was impregnated with said polyurethane liquid, and treated by the same operations as in Example 1 except that the dry-heat treatment subsequent to wet-heat treatment and hot-air drying were carried out for two minutes at a temperature of 160° C., and as a result, a polyurethane-containing sheet was obtained.

(Sea Removal, Napping, Dyeing, and Reduction Cleaning)

For said polyurethane-containing sheet, sea removal, napping, dyeing, and reduction cleaning were performed similarly to Example 1 to provide a sheet-like material.

The resulting sheet-like material had good appearance quality, texture, and wear resistance.

Example 5

(Non-Woven Fabric for Fibrous Base)

Non-woven fabric for fibrous base similar to that used in Example 1 was used.

(Polyurethane Liquid)

Five parts by mass of sodium sulfate and three parts by mass of OBSH (Celmike S manufactured by Sankyo Kasei Co., Ltd., foaming temperature 160° C.) were added as a thermosensitive coagulation agent and as a foaming agent, respectively, to a liquid containing, as solid content, 100 parts by mass of Polyurethane 3, which is the same liquid as that used in Example 4. Then water was added so that the overall liquid would have a solid content of 10% by mass to provide a water-dispersed polyurethane liquid.

(Addition of Polyurethane)

Said non-woven fabric for fibrous base was impregnated with said polyurethane liquid, and treated by the same operations as in Example 1 except that a polyurethane liquid different from that used in Example 1 was used for further polyurethane liquid impregnation and that the dry-heat treatment subsequent to wet-heat treatment and hot-air drying were carried out for two minutes at a temperature of 160° C., and as a result, a polyurethane-containing sheet was obtained.

(Sea Removal, Napping, Dyeing, and Reduction Cleaning)

For said polyurethane-containing sheet, sea removal, napping, dyeing, and reduction cleaning were performed similarly to Example 1 to provide a sheet-like material.

The resulting sheet-like material had good appearance quality, texture, and wear resistance.

Comparative Example 1

(Non-Woven Fabric for Fibrous Base)

Non-woven fabric for fibrous base similar to that used in Example 1 was used.

(Polyurethane Liquid)

A polyurethane liquid was prepared by the same operations as in Example 1 except that no foaming agent was used.

(Addition of Polyurethane)

Said non-woven fabric for fibrous base was impregnated with said polyurethane liquid, and treated similarly to Example 1 to produce a polyurethane-containing sheet.

(Sea Removal, Napping, Dyeing, and Reduction Cleaning)

For said polyurethane-containing sheet, sea removal, napping, dyeing, and reduction cleaning were performed similarly to Example 1 to provide a sheet-like material.

In Comparative Example 1, no foaming agent was used, resulting in a sheet-like material with poor appearance quality and hard texture.

Comparative Example 2

(Non-Woven fabric for Fibrous Base)

Non-woven fabric for fibrous base similar to that used in Example 1 was used.

(Polyurethane Liquid)

Fifteen parts by mass of sodium sulfate and five parts by mass of sodium hydrogen carbonate (Celmike 266 manufactured by Sankyo Kasei Co., Ltd., foaming temperature 140° C.) were added as thermosensitive coagulation agent and foaming agent, respectively, to a liquid containing, as solid content, 100 parts by mass of polycarbonate-based forced-emulsification type polyurethane containing triethylamine carboxylate (Polyurethane 3), which had been prepared by using a polycarbonate copolymer produced from hexamethylene carbonate and 3-methylpentane carbonate as polyol component and using isophorone diisocyanate as isocyanate component. Then water was added so that the overall liquid would have a solid content of 10% by mass to provide a water-dispersed polyurethane liquid.

(Addition of Polyurethane)

Said non-woven fabric for fibrous base was impregnated with said polyurethane liquid, and treated similarly to Example 1 to produce a polyurethane-containing sheet.

(Sea Removal, Napping, Dyeing, and Reduction Cleaning)

For said polyurethane-containing sheet, sea removal, napping, dyeing, and reduction cleaning were performed similarly to Example 1 to provide a sheet-like material.

In Comparative Example 2, polyurethane was had a poor 100% modulus, and accordingly, the resulting sheet-like material was low in wear resistance and also low in grindability in the napping step, leading to poor appearance quality.

Comparative Example 3

(Non-Woven Fabric for Fibrous Base)

Non-woven fabric for fibrous base similar to that used in Example 1 was used.

(Polyurethane Liquid)

Fifteen parts by mass of sodium sulfate and 15 parts by mass of sodium hydrogen carbonate (Celmike 266 manufactured by Sankyo Kasei Co., Ltd, foaming temperature 140° C.) were added as thermosensitive coagulation agent and foaming agent, respectively, to a liquid containing, as solid content, 100 parts by mass of polycarbonate-based forced-emulsification type polyurethane containing triethylamine carboxylate (Polyurethane 5), which had been prepared by using polyhexamethylene carbonate as polyol component and using dicyclohexylmethane isocyanate as isocyanate component and which had a larger hard segment content than Polyurethane 3 used in Example 4. Then water was added so that the overall liquid would have a solid content of 10% by mass to provide a water-dispersed polyurethane liquid.

(Addition of Polyurethane)

Said non-woven fabric for fibrous base was impregnated with said polyurethane liquid, and treated similarly to Example 1 to produce a polyurethane-containing sheet.

(Sea Removal, Napping, Dyeing, and Reduction Cleaning)

For said polyurethane-containing sheet, sea removal, napping, dyeing, and reduction cleaning were performed similarly to Example 1 to provide a sheet-like material.

In Comparative Example 3, polyurethane had an excessively high 100% modulus, and accordingly, the resulting sheet-like material had hard texture and was low in grindability in the napping step, resulting in poor appearance quality.

Table 1 shows the composition and the properties of the polyurethane liquids which were prepared and used in each Example.

TABLE 1

|  | Type of Polyurethane | Viscosity (mPa·s) | 100% Modulus (MPa) | Foaming Agent Type | Foaming Temperature (°C.) | Amount Added (wt %) | Film Density (g/cm³) | Thermosensitive Coagulant | Thermosensitive Coagulation Amount Added (wt %) | Temperature (°C.) |
| --- | --- | --- | --- | --- | --- | --- | --- | --- | --- | --- |
| Example 1 | 1 | 8 | 5.3 | Sodium hydrogen carbonate | 140 | 5 | 0.31 | APS | 2 | 74 |
| Example 2 | 1 | 6 | 5.3 | Sodium hydrogen carbonate | 140 | 3 | 0.46 | APS | 2 | 74 |
| Example 3 | 2 | 6 | 3.2 | Sodium hydrogen carbonate | 140 | 3 | 0.38 | APS | 2 | 76 |
| Example 4 | 3 | 12 | 7.6 | OBSH | 160 | 18 | 0.24 | Sodium sulfate | 18 | 65 |
| Example 5 | 3 | 5 | 7.6 | OBSH | 160 | 3 | 0.63 | Sodium sulfate | 15 | 67 |
| Comparative Example 1 | 1 | 4 | 5.3 | None | — | — | 1.05 | APS | 2 | 74 |
| Comparative Example 2 | 4 | 6 | 1.1 | Sodium hydrogen carbonate | 140 | 5 | 0.21 | Sodium sulfate | 15 | 63 |
| Comparative Example 3 | 5 | 11 | 9.6 | Sodium hydrogen carbonate | 140 | 5 | 0.78 | Sodium sulfate | 15 | 68 |

Table 2 shows the densities, the pore diameters in polyurethane, and other evaluation results regarding the sheet-like materials obtained in each Example and comparative example.

TABLE 2

|  | Pore Diameter (μm) | Sheet Density (g/cm³) | Texture (mm) | Wear Resistance (mg) | Appearance Quality (Grade) |
| --- | --- | --- | --- | --- | --- |
| Example 1 | 150 | 0.36 | 30 | 22 | 5 |
| Example 2 | 130 | 0.48 | 34 | 18 | 5 |
| Example 3 | 100 | 0.42 | 33 | 28 | 4 |
| Example 4 | 50 | 0.28 | 35 | 34 | 5 |
| Example 5 | 40 | 0.68 | 46 | 14 | 3 |
| Comparative Example 1 | 0 | 0.45 | 55 | 13 | 2 |
| Comparative Example 2 | 240 | 0.22 | 13 | 51 | 2 |
| Comparative Example 3 | 7 | 0.61 | 140 | 11 | 1 |

The invention claimed is:

1. A sheet-like material comprising polyurethane provided with a coagulation of water-dispersed polyurethane, wherein the polyurethane is contained in a fibrous base formed of extra-fine fibers with an average single fiber diameter of 0.3 - 7 μm, wherein the polyurethane contains pores with a diameter of 10 - 200 μm, and wherein the polyurethane is uniformly distributed across a thickness direction of the fibrous base.

2. A sheet-like material as set forth in claim 1, wherein the density of said sheet-like material is 0.2 - 0.7 g/cm³.

* * * * *